United States Patent
Apps et al.

(10) Patent No.: US 11,132,375 B2
(45) Date of Patent: Sep. 28, 2021

(54) SYSTEM FOR DATA STORAGE AND RETRIEVAL

(71) Applicant: BAE SYSTEMS plc, London (GB)

(72) Inventors: Stephen David Apps, Portsmouth (GB); Roger Leonard Hobley, Portsmouth (GB)

(73) Assignee: BAE Systems plc, London (GB)

( * ) Notice: Subject to any disclaimer, the term of this patent is extended or adjusted under 35 U.S.C. 154(b) by 95 days.

(21) Appl. No.: 16/612,021

(22) PCT Filed: May 11, 2018

(86) PCT No.: PCT/GB2018/051274
§ 371 (c)(1),
(2) Date: Nov. 8, 2019

(87) PCT Pub. No.: WO2018/206974
PCT Pub. Date: Nov. 15, 2018

(65) Prior Publication Data
US 2020/0125577 A1    Apr. 23, 2020

(30) Foreign Application Priority Data

May 12, 2017  (EP) ..................................... 17275066
May 12, 2017  (GB) ..................................... 1707604

(51) Int. Cl.
*G06F 16/25*    (2019.01)
*G06F 16/215*   (2019.01)
*G06F 16/23*    (2019.01)

(52) U.S. Cl.
CPC .......... *G06F 16/254* (2019.01); *G06F 16/215* (2019.01); *G06F 16/2365* (2019.01); *G06F 16/252* (2019.01)

(58) Field of Classification Search
CPC ............................... G06F 16/93; G06F 16/254
See application file for complete search history.

(56) References Cited

U.S. PATENT DOCUMENTS

| 7,698,323 | B1 | 4/2010 | Rangan et al. |
| 8,463,888 | B1 * | 6/2013 | Boyer .................... G06Q 50/28 709/223 |
| 10,810,654 | B1 | 10/2020 | Robertson et al. |
| 2003/0225742 | A1 | 12/2003 | Tenner et al. |

(Continued)

FOREIGN PATENT DOCUMENTS

| GB | 2403041 A | 12/2004 |
| WO | 2004036455 A2 | 4/2004 |

(Continued)

OTHER PUBLICATIONS

International Preliminary Report on Patentability received for PCT Application No. PCT/GB2018/051274, dated Nov. 21, 2019. 8 pages.

(Continued)

*Primary Examiner* — Albert M Phillips, III
*Assistant Examiner* — Courtney Harmon
(74) *Attorney, Agent, or Firm* — Finch & Maloney PLLC

(57) ABSTRACT

A method for providing access to a database for product life cycle support (PLCS database), the method comprising receiving from a client apparatus an input data item including heading data identifying the input data item; correlating said heading data with a data field used in the PLCS database amongst all data fields used in the PLCS database thereby identifying a correlated entry in the PLCS database to be associated with the input data item; searching the PLCS database using said correlated entry; retrieving one or more data elements from the PLCS database according to said search; outputting to the client apparatus a return data item which includes said heading data identifying the return data item and which includes said retrieved data elements(s).

20 Claims, 7 Drawing Sheets

(56) References Cited

U.S. PATENT DOCUMENTS

| | | | |
|---|---|---|---|
| 2005/0050068 | A1 | 3/2005 | Vaschillo et al. |
| 2005/0209876 | A1 | 9/2005 | Kennis et al. |
| 2008/0162494 | A1 | 7/2008 | Long et al. |
| 2008/0250057 | A1* | 10/2008 | Rothstein ............... G06F 16/20 |
| 2009/0008441 | A1 | 1/2009 | Montgomery et al. |
| 2009/0299979 | A1 | 12/2009 | Suh et al. |
| 2010/0030767 | A1 | 2/2010 | Kim et al. |
| 2012/0109988 | A1 | 5/2012 | Li et al. |
| 2012/0303425 | A1 | 11/2012 | Katzin et al. |
| 2013/0024364 | A1 | 1/2013 | Shrivastava et al. |
| 2013/0159081 | A1 | 6/2013 | Shastry et al. |
| 2013/0166332 | A1 | 6/2013 | Hammad |
| 2013/0204884 | A1 | 8/2013 | Stewart et al. |
| 2013/0204886 | A1 | 8/2013 | Faith et al. |
| 2013/0275450 | A1* | 10/2013 | Boyer .................... G06Q 50/30 |
| | | | 707/756 |
| 2014/0330845 | A1 | 11/2014 | Feldschuh |
| 2014/0337175 | A1 | 11/2014 | Katzin et al. |
| 2016/0019273 | A1 | 1/2016 | Bowman et al. |
| 2016/0139886 | A1 | 5/2016 | Perdriau et al. |
| 2017/0286468 | A1 | 10/2017 | Hoyle et al. |
| 2017/0295057 | A1* | 10/2017 | Dost ....................... H04W 4/70 |
| 2018/0009330 | A1* | 1/2018 | Ricci .................. G07C 9/00563 |
| 2020/0125541 | A1 | 4/2020 | Apps et al. |
| 2020/0125554 | A1 | 4/2020 | Apps et al. |

FOREIGN PATENT DOCUMENTS

| | | | |
|---|---|---|---|
| WO | 2018206973 | A1 | 11/2018 |
| WO | 2018206974 | A1 | 11/2018 |
| WO | 2018206975 | A1 | 11/2018 |

OTHER PUBLICATIONS

International Search Report and Written Opinion received for PCT Application No. PCT/GB2018/051275, dated Jun. 6, 2018. 13 pages.

International Preliminary Report on Patentability received for PCT Application No. PCT/GB2018/051275, dated Nov. 21, 2019. 9 pages.

GB Search Report under Section 17(5) for GB Application No. 1707605.0 dated Oct. 26, 2017. 3 pages.

Extended European Search Report received for EP Application No. 17275067.1 dated Jun. 29, 2017. 8 pages.

International Search Report and Written Opinion received for PCT Application No. PCT/GB2018/051273, dated Jun. 8, 2018. 13 pages.

International Preliminary Report on Patentability received for PCT Application No. PCT/GB2018/051273, dated Nov. 21, 2019. 8 pages.

Extended European Search Report received for EP Application No. 17275065.5 dated Jun. 29, 2017. 8 pages.

International Search Report and Written Opinion received for PCT Application No. PCT/GB2018/051274, dated Jun. 11, 2018. 12 pages.

Extended European Search Report received for EP Application No. 17275066.3 dated Oct. 23, 2017. 8 pages.

* cited by examiner

Fig. 3

| PartID | PartTitle | NatoStockNo | Weight | Color |
|---|---|---|---|---|
| 1 | Rudder | QW-243535 | 3.3 | Gray |
| 2 | Engine | QW-326535 | 45 | Gray |
| 3 | Radar | QW-766535 | 1.2 | Black |
| 4 | Chilled Water | QW-383535 | 12 | Black |

SYSTEM FOR DATA STORAGE AND RETRIEVAL

FIELD OF THE INVENTION

The invention relates to a system for improved data storage and retrieval, such as e.g. database systems and methods for through-life management of complex assets. In particular, though not exclusively, the invention relates to information management and exchange systems for through-life management of complex assets such as naval vessels/vehicles, or the like.

BACKGROUND

Effectively managing all of the information related to production data and maintenance process data needed to produce, and then support and maintain a complex product Cassen is a difficult task. A significant problem arises because, typically, any one of the potentially many participants involved in such processes, do not have appropriate access to information created by any of the other participants. As a result, information which already exists either has to be re-generated, re-formatted or re-entered manually with a proliferation of errors over time, or managers are forced to make decisions based on incomplete or inaccurate information. The impact of information errors and omissions add heavy costs and time delays to manufacturing and maintenance processes.

The invention aims to provide an improved database system and method for through-life management of complex assets.

BRIEF DESCRIPTION

At its most general, a concept of the invention is the means of providing a common database of optimal data/information (e.g. production, status and/or maintenance data) about a physical asset (e.g. vehicle, vessel, machine, product/item) gleaned/learned from data relating to the asset submitted over a period of time by multiple separate users. Each user may employ a different respective (local) schema, terminology or naming conventions relating to the self same asset. Those disparate users are able to interrogate and/or update the common database using their respective (local) schema, terminology or naming conventions. Accordingly, through a period of time, preferably its lifetime, multiple disparate users may use the common database regarding a shared asset, without being required to know or use the database schema of the common database, and the content of the database is optimised by selecting optimal data from amongst asset data submitted by the multiple users. The optimal data may preferably be optimal in the sense of being: more accurate or extensive in information content numerically and/or textually; expressed in a manner compliant with predetermined or accepted terminology, schema or naming convention; containing fewer or no errors/typos (numerical and/or textual).

Information about an asset will, over time, typically be created in many different locations using different local IT systems, databases and/or users, each potentially using bespoke authoring tools and each potentially employing different schema, terminology and naming conventions relating to the self same asset. The invention allows different, disparate databases, and the users, to interact with (e.g. update, interrogate etc.) the common database each using a different respective (local), non-common database schema, naming convention or terminology. In this way, effective and useful access to information about the asset may be provided to different, disparate IT systems or databases, and the users of them. The invention allows the asset information to be consolidated while enabling direct access by disparate IT systems employing their disparate terminology and naming conventions.

Preferably, the invention may provide a data storage and retrieval system for a computer memory for maintaining the common database for product life cycle support. The common database may employ a PLCS database schema. Thus, a PLCS schema may be used as a mapping between systems having a standardised data exchange capabilities.

The PLCS standard ISO 10303-239 (PLCS) is an international standard that specifies an information model that defines what information can be exchanged and represented to support a product through life. In the system or the method of the invention, in preferred aspects, the PLCS database (schema) may be compliant with a PLCS open standard ISO 10303-239. The invention, in any aspect herein, may provide a system or method in which the PLCS database is compliant with a PLCS open standard ISO 10303-239.

In a first aspect, the invention may provide a data storage and retrieval system for a computer memory for maintaining a database for product life cycle support (PLCS database), comprising a computer or computer network system which:

receives two or more data exchange packets comprising data fields and populated with data according to different respective database schema wherein each received data exchange item comprises field headers associated with respective said data fields according to a said respective database schema;

transforms one or more field headers of the received data exchange packets into a common field header format according to a common domain model schema;

selects optimal data from amongst said data;

generates a master data exchange packet comprising said common field headers as field headers of the master data exchange packet, and said optimal attribute data in data fields of the master data exchange packet in association with said field headers thereof;

maps the field headers of the master data exchange packet to corresponding field headers of the PLCS database schema;

loads the optimal attribute data of the master data exchange packet into the PLCS database according to the mapped PLCS field headers.

Thus, the invention may provide a data storage and retrieval system for a computer memory for maintaining a database for product life cycle support (PLCS database), comprising a computer or computer network system. The computer or computer network system is arranged to receive two or more data exchange packets comprising data fields and populated with data according to different respective database schema. Each received data exchange item may comprise: identity data within respective said data fields identifying a respective entity; attribute data within respective said data fields identifying an attribute of each entity, respectively; and, field headers associated with respective said data fields according to a said respective database schema. An/each field header may identify a particular domain (e.g. name/class/title/designation etc.) of an attribute, and all attribute values associated with a given field header may belong to the same attribute domain. Thus the field headers may collectively define the collection of different attribute domains conveyed by the data exchange item. The attribute data may provide a particular value/ property of that domain of attribute (field header) of an asset. For example, purely as an illustration of this principle, in a school database, a student may be considered as an entity and his/her attributes include: Name; Age; Class No. etc. Each of these attributes has an attribute value for a given student, and the collection of attribute values for any one attribute (e.g. age) covering multiple students, defines the domain of that attribute. A field header, and/or an identity data and/or an attribute data may comprise a lexical item, or a numerical value/item, or a combination of both. Consequently, received data exchange packets provide the information defining how the sender of the packet chooses to identify each item referred to in the packet (e.g. asset, or a part of it, or information regarding its status/history).

Typically, these identity data items will be bespoke to the system originating them, and are typically not the same as between different systems from which the two or more data exchange packets may originate. The attribute data items and/or field headers may be expressed in a manner bespoke to the system originating them. While attribute data expressing the self-same attribute of the common asset may be approximately the same, as between two different originating senders of the received data exchange packets, given that they represent the same property/attribute of the asset, they are often not exactly the same, e.g. with one being more precisely or fully expressed than the other. This is also often true of the received field headers identifying the nature of the attribute.

The computer or computer network system may select, for each said entity, from amongst the attribute data the optimal attribute data thereof. The optimal data may preferably be determined to be optimal according to a predetermined selection criterion implemented by a selection algorithm. The algorithm may determine a data item as being more optimal than another in the sense of being: more accurate or extensive in information content numerically and/or textually; expressed in a manner compliant with predetermined or accepted terminology, schema or naming convention; containing fewer or no errors/typos (numerical and/or textual). The computer or computer network system may map the field headers of the master data exchange packet to corresponding field headers of the PLCS database schema. The computer or computer network system may load the optimal attribute data of the master data exchange packet into the PLCS database according to the mapped PLCS field headers.

The invention may provide a domain model and its implementation, to allow easier and more user-friendly interaction with a PLCS database system. The term 'domain model' is typically understood in the art to refer to a system of abstractions that describes selected aspects of some particular sphere or activity (a 'domain') undertaken by an individual, or by an organisation of the like. The domain model might, for example, be a representation of meaningful real-world concepts that relate to the sphere of activity (the 'domain') that can be modelled in software. A domain model can be used to solve problems related to that sphere of activity (the 'domain'). The real-world concepts could include the data generated/handled by an organisation and the rules which the organisation uses in relation to handling that data. A domain model generally uses the vocabulary of the sphere of activity (the 'domain') so that the software model can be used to communicate with non-technical users.

The domain model of the invention is preferably designed to support data exchange with a PLCS system for specific activities, providing rules for how to combine/correlate PLCS entities and external data items, or User Objects, in that exchange. The User Object uses meaningful terms to specify the possible content of any exchange. The computer or computer network system may be arranged to transform one or more field headers of the received data exchange packets into a common field header format according to a common domain model schema.

The computer or computer network system may be arranged to receive the data exchange packets comprising: identity data (ID) within respective said data fields identifying a respective entity; attribute data within respective said data fields identifying an attribute of each entity, respectively; and said computer or computer network system selects, for each said entity, from amongst the attribute data the optimal attribute data thereof.

The computer or computer network system may be arranged to configure the master data exchange packet for said computer memory according to a logical table including: a plurality of logical rows each corresponding to a record of information comprising said optimal attribute data, each said logical row having two or more said identity data (ID) from the received data exchange packets which each separately identify the same said logical row; a plurality of logical columns intersecting said plurality of logical rows to define a plurality of logical cells, each said logical column having a respective field header to identify said logical column and in which at least one said logical column comprises said optimal attribute data. The computer or computer network system may map the field headers of said logical table to corresponding field headers of said PLCS database schema.

The logical table may be defined by, or in accordance with, a so-called Entity-Relationship (ER) Logical Database Model. A relational model defines rules for organizing data items, adhered to by the database management system implementing it. In this way, the invention may record real-world scenarios into a database model, defining entities, their entity data, and their attribute data. This allows relationships among entities to be identified, encoded and accessed more efficiently in the database. The logical association among entities is referred to in the art as a 'relationship'. Relationships between entities may be mapped in various ways, as would be readily apparent to the skilled person. The provision of a logical table according to a so-called Entity-Relationship (ER) Logical Database Model, enables this in preferred aspects of the invention. The logical table, and the data stored within it, may provide a so-called 'relation' table for a relational database. Each row in the relation table may represent a particular entity, and each column may represent an attribute that is shared over all entities represented in that table.

The computer or computer network system may be arranged to generate the master data exchange packet comprising said identity data (ID) from the received data exchange packets in association with corresponding said entities of the master data exchange packet.

The computer or computer network system may be arranged to assign a respective priority value to each of said attribute data, and selects the attribute having the highest priority value as the optimal attribute. This aspect of the invention provides a degree of data cleansing whereby the host computer system of the PLCS database may monitor when different terms are used by different users to refer to the same asset. The host computer system may link these two different terms to the same single term employed in the PLCS database, and use that single term to maintain/access/ interrogate the PLCS database. Priorities may be used by the host computer system to identify which one of several different user-originating terms, for the same asset, is the most suitable one to use as the 'approved' term in communications with client apparatuses and their users. The host computer system may be arranged to communicate back to client apparatuses (and their users) information from the PLCS database associated with the single term used therein, and may use the 'approved' term within such communications to identify the asset to the client apparatus.

The method may include calculating a respective said priority value for each of the first and second identifiers according to a combination of a plurality of priority weighting values determined according to predetermined characteristics of each of the first and second identifiers.

The method may include: retrieving from the PLCS database the entry associated with the correlated data field; and, outputting to the second client apparatus a return data item which includes the second identifier identifying the return data item and which includes the retrieved entry.

The computer or computer network system may be arranged to: receive a data retrieval request from a client apparatus employing a respective client database schema; retrieve from the PLCS database said optimal attribute data; transform the common field header associated with the retrieved optimal attribute data into a field header format of the client database schema; and, output to the client apparatus a return data exchange packet which includes a data field with an associated field header in said format of the client database schema and populated with said retrieved optimal attribute.

In a second aspect, the invention may provide a method for data storage and retrieval in a computer memory for maintaining a database for product life cycle support (PLCS database), the method comprising:

receiving two or more data exchange packets comprising data fields and populated with data according to different respective database schema wherein each received data exchange item comprises field headers associated with respective said data fields according to a said respective database schema;

transforming one or more field headers of the received data exchange packet into a common field header format according to a common domain model schema;

selecting optimal data from amongst said data;

generating a master data exchange packet comprising said common field headers as field headers of the master data exchange packet, and said optimal attribute data in data fields of the master data exchange packet in association with said field headers thereof;

mapping the field headers of the master data exchange packet to corresponding field headers of the PLCS database schema;

loading the optimal attribute data of the master data exchange packet into the PLCS database according to the mapped PLCS field headers.

In the method, the step of receiving may include receiving said data exchange packets comprising: identity data (ID) within respective said data fields identifying a respective entity; attribute data within respective said data fields identifying an attribute of each entity, respectively. The step of selecting may include selecting, for each said entity, from amongst the attribute data the optimal attribute data thereof.

The method may include configuring the master data exchange packet for said computer memory according to a logical table including: a plurality of logical rows each corresponding to a record of information comprising said optimal attribute data, each said logical row having two or more said identity data (ID) from the received data exchange packets which each separately identify the same said logical row; a plurality of logical columns intersecting said plurality of logical rows to define a plurality of logical cells, each said logical column having a respective field header to identify said logical column and in which at least one said logical column comprises said optimal attribute data. The step of mapping may map said field headers of said logical table to corresponding field headers of said PLCS database schema.

The step of generating may include generating said master data exchange packet comprising said identity data (ID) from the received data exchange packets in association with corresponding said entities of the master data exchange packet.

The method may include assigning a respective priority value to each of said attribute data, wherein said selecting includes selecting the attribute having the highest priority value as the optimal attribute.

The method may include receiving a data retrieval request from a client apparatus employing a respective client database schema, retrieving from the PLCS database said optimal attribute data, transforming the common field header associated with the retrieved optimal attribute data into a field header format of the client database schema and, outputting to the client apparatus a return data exchange packet which includes a data field with an associated field header in said format of the client database schema and populated with said retrieved optimal attribute.

In a further aspect, the invention may provide a data storage and retrieval system for a computer memory for maintaining a database for product life cycle support (PLCS database), comprising a computer or computer network system including: means for receiving two or more data exchange packets comprising data fields and populated with data according to different respective database schema wherein each received data exchange item comprises: identity data within respective said data fields identifying a respective entity; attribute data within respective said data fields identifying an attribute of each entity, respectively; field headers associated with respective said data fields according to a said respective database schema; and means for transforming one or more field headers of the received data exchange packets into a common field header format according to a common domain model schema; means for selecting, for each said entity, from amongst the attribute data the optimal attribute data thereof; means for generating a master data exchange packet comprising: said common field headers as field headers of the master data exchange packet; said identity data from the received data exchange packets in association with corresponding said entities of the master data exchange packet; said optimal attribute data in data fields of the master data exchange packet in association with said field headers thereof; means for mapping the field headers of the master data exchange packet to corresponding field headers of the PLCS database schema; means for loading the optimal attribute data of the master data exchange packet into the PLCS database according to the mapped PLCS field headers.

In another aspect, the invention may provide a data storage and/or retrieval system for a computer memory for maintaining a database for product life cycle support (PLCS database), comprising a computer or computer network system which:

receives two or more data exchange packets comprising data fields and populated with data according to different respective database schema wherein each received data exchange packet comprises:

identity data (ID) within respective said data fields identifying a respective entity;

attribute data within respective said data fields identifying an attribute of each entity, respectively;

selects, for each said entity, from amongst the attribute data the optimal attribute data thereof;

configures said computer memory according to a logical table including:

a plurality of logical rows each corresponding to a record of information comprising said optimal attribute data, each said logical row having two or more said identity data (ID) from the received data exchange packets which each separately identify the same said logical row;

a plurality of logical columns intersecting said plurality of logical rows to define a plurality of logical cells, each said logical column having a respective field header to identify said logical column and in which at least one said logical column comprises said optimal attribute data;

wherein the computer or computer network system maps said field headers of said logical table to corresponding field headers of said PLCS database schema.

In yet another aspect, the invention may provide a computer program product comprising computer-executable instructions arranged to control a computer to implement the method of any aspect described above, when executed on the computer.

In an aspect, the invention may provide a method for providing access to a database for product life cycle support (PLCS database), the method comprising, receiving from a client apparatus an input data item including heading data identifying the input data item, correlating the heading data with a data field used in the PLCS database amongst all data fields used in the PLCS database thereby identifying a correlated entry in the PLCS database to be associated with the input data item, searching the PLCS database using the correlated entry, retrieving one or more data elements from the PLCS database according to the search, outputting to the client apparatus a return data item which includes the heading data identifying the return data item and which includes the retrieved data elements(s).

The method may include receiving one or more data element(s) within the received input data item; and, searching the PLCS database using the correlated entry; and, entering a received data element as a new data element of the PLCS database at a location therein determined according to the search.

The heading data may correspond to a data field from a client database, the method including subsequently correlating the one or more retrieved PLCS data elements with the data field from the client database thereby identifying a correlated entry from the client database to be associated with the one or more retrieved PLCS data elements, and subsequently outputting the return data item.

The method may include providing a mapping database containing a plurality of client headings data from a client database and a plurality of PLCS headings data used in the PLCS database, wherein each said client headings data item is stored in the mapping database in association with respective PLCS headings data, and the correlating includes searching the mapping database to identify a said association.

In an aspect, the invention may provide a system for providing access to a database for product life cycle support (PLCS database), the system comprising, a communications network; a storage device including a PLCS database PLCS data elements and arranged in communication with the communications network; a client device arranged in communication with the communications network; a host computer system arranged in communication with the communications network and with the storage device, wherein the host computer system is arranged to implement a method comprising: receiving an input data item (e.g. data exchange packet) from the client device via the communications network, the input data item including headings data associated with a data element(s) within the input data item/packet; correlating the heading data with headings data used in the PLCS database thereby identifying a correlated entry in the PLCS database to be associated with the input data element; searching the PLCS database using the correlated entry; retrieving one or more data elements from the PLCS database according to the search; outputting to the client a return data packet which includes the heading data identifying the return data item and which includes the retrieved data elements(s).

The host computer system may be arranged to implement the method including receiving one or more user data element(s) within the received input data item/packet; and, searching the PLCS database using the correlated entry; and, entering a client data element as a new data element of the PLCS database at a location therein determined according to the search.

The heading data may correspond to a data heading from a client database, and the host computer system may be arranged to implement the method including: subsequently correlating the one or more retrieved PLCS data elements with the heading from the client database thereby identifying a correlated entry from the client database to be associated with the one or more retrieved PLCS data elements, and subsequently outputting the return data item/packet.

The system may include a mapping database containing a plurality of client heading data items from a client database and a plurality of PLCS headings used in the PLCS database, wherein each said client heading data item is stored in the mapping database in association with a respective PLCS headings, and the host computer system is arranged to implement the method such that the correlating (and the subsequent correlating) includes searching the mapping database to identify a said association.

In an aspect, the invention may provide a method for communicating with a database for product life cycle support (PLCS database), the method comprising: receiving from a first client apparatus a first communication containing an input data item for entry in the PLCS database and a first identifier identifying the input data item; correlating the first identifier with a data field (e.g. header(s); attributes data field(s)) used in the PLCS database amongst all data fields used in the PLCS database thereby identifying a correlated data field of the PLCS database to be associated with the input data item; searching the PLCS database to access an entry therein associated with the correlated data field; updating the entry of the PLCS database according to the input data item; re-correlating the correlated data field of the PLCS database with a second identifier associated with a second client apparatus; outputting to the second client apparatus a second communication containing an output data item according to the updated PLCS database entry which includes the second identifier identifying the output data item to the second client apparatus.

In this way, a first client apparatus may access the PLCS database and update/modify that database, and the host computer system in control of the PLCS database may then generate a communication of that update/modification to be sent to a second client apparatus. The host system may keep track of the changes to the PLCS database and notify interested other client apparatuses (e.g. remote sites, databases or computer systems). For example, a first client apparatus may include a user-interface (e.g. interactive graphic) in which user-inputs may be performed, which may cause the first client apparatus to generate data for entry into the PLCS database, to update/modify the database. For example, a user of the first client apparatus may wish to update the PLCS database to indicate that an event, task or job has been started, or completed, in respect of a particular project of work in which many disparate users are involved. A PLCS database update may, for example, occur to indicate completion/commencement of a process stage within a larger work project. As the project progresses a user may input this fact into the PLCS database via the user interface local to them, to indicate progression of steps within the work-flow. The invention, in this aspect, may permit that when a process stage is completed, the PLCS database may be updated, and that update may be communicated to other client apparatuses (e.g. outside sites, e.g. another shipyard's computer system) in a language that the computer system of that outside site can understand. The invention, in this aspect, relates to 'correlation' simply to allow a first client apparatus (and its user) to access to PLCS without needing to 'understand' the PLCS terminology/language. The 'correlating' step implemented by the invention, in this aspect, is thereby used in allow updating data to enter the PLCS database, and also to use the updated PLCS database to generate an update message, to transmit to the interested third parties (second client apparatus) to allow that third party to update its own local database directly in a 'language' it understands (i.e. using the 're-correlation' process).

The method may include receiving one or more data element(s) within the received input data item; and, searching the PLCS database using the correlated entry; and, entering a received data element as a new data element of the PLCS database at a location therein determined according to the search.

The first identifier may correspond to a data field (e.g. header(s); attributes data field(s)) from a first client database, and the second identifier may correspond to a data field (e.g. header(s); attributes data field(s)) from a second client database whereby the re-correlating identifies a correlated entry from the second client database to be associated with the updated PLCS data field.

The method may include providing a mapping database containing a plurality of identifier data items (e.g. header(s)) from a client database and a plurality of data fields (e.g. header(s); attributes data field(s)) used in the PLCS database, wherein each said identifier data item is stored in the mapping database in association with a respective said data field, and the correlating includes searching the mapping database to identify a said association.

The method may include providing a mapping database containing a plurality of identifier data items (e.g. header(s); attributes data field(s)) from a client apparatus and a plurality of data fields used in the PLCS database, wherein each said data field is stored in the mapping database in association with a respective said identifier data item, and the subsequent re-correlating includes searching the mapping database to identify a said association.

The invention in another aspect may provide a system for providing access to a database for product life cycle support (PLCS database), the system comprising: a communications network; a storage device including a PLCS database PLCS data elements and arranged in communication with the communications network; a plurality of client apparatuses arranged in communication with the communications network; a host computer system arranged in communication with the communications network and with the storage device, wherein the host computer system is arranged to implement a method comprising: receiving from a client apparatus a communication containing an input data item for entry in the PLCS database and an identifier identifying the input data item (e.g. header(s); attributes data field(s)); correlating the identifier with a data field used in the PLCS database amongst all data fields used in the PLCS database thereby identifying a correlated data field of the PLCS database to be associated with the input data item; searching the PLCS database to access an entry therein associated with the correlated data field; updating the entry of the PLCS database according to the input data item; re-correlating the correlated data field of the PLCS database with a second identifier (e.g. header(s); attributes data field(s)) associated with a second client apparatus; outputting to the second client apparatus a communication containing an output data item according to the updated PLCS database entry which includes the second identifier identifying the output data item to the second client apparatus.

The host computer system may be arranged to implement a method including; receiving one or more data element(s) within the received input data item; and, searching the PLCS database using the correlated entry; and, entering a received data element as a new data element of the PLCS database at a location therein determined according to the search.

The first identifier may correspond to a data field from a first client database, and the second identifier may correspond to a data field from a second client database whereby the re-correlating identifies a correlated entry from the second client database to be associated with the updated PLCS data field.

The host computer system may be arranged to implement a method including providing a mapping database as described above for use in the correlating/re-correlating steps.

In a yet further aspect, the invention may provide a computer program product comprising compute-executable instructions arranged to control a computer to implement the method of any of the above aspects when executed on the computer.

In another aspect, the invention may provide a computer, or a system of computers, or a network of computers, programmed to implement the method of any of the above aspects. The term 'system' herein may refer to, or include, e.g. a network of computers, which may be connected in communication via a communications network (e.g. an intranet or the Internet).

According to aspects of the invention, User Objects may be "mapped" to a central database (e.g. PLCS). This mapping may be represented by Look-up-Tables or Templates. Each User Object may have a corresponding Template that specifies how the User Object is represented using the central database (e.g. PLCS). Having mapped the User Object to the central database (e.g. PLCS), the complete central database (e.g. PLCS) that is required by the user is identified using naming-convention terms compatible with the user's database system.

There now follow examples of the many and various embodiments of the invention. These describe embodiments which are useful for a better understanding of the invention, but which are not intended to be limiting.

BRIEF DESCRIPTION OF THE DRAWINGS

FIG. 3 illustrates a data exchange packet containing header fields and attributes fields associated with them;

DETAILED DESCRIPTION

Figure 1:
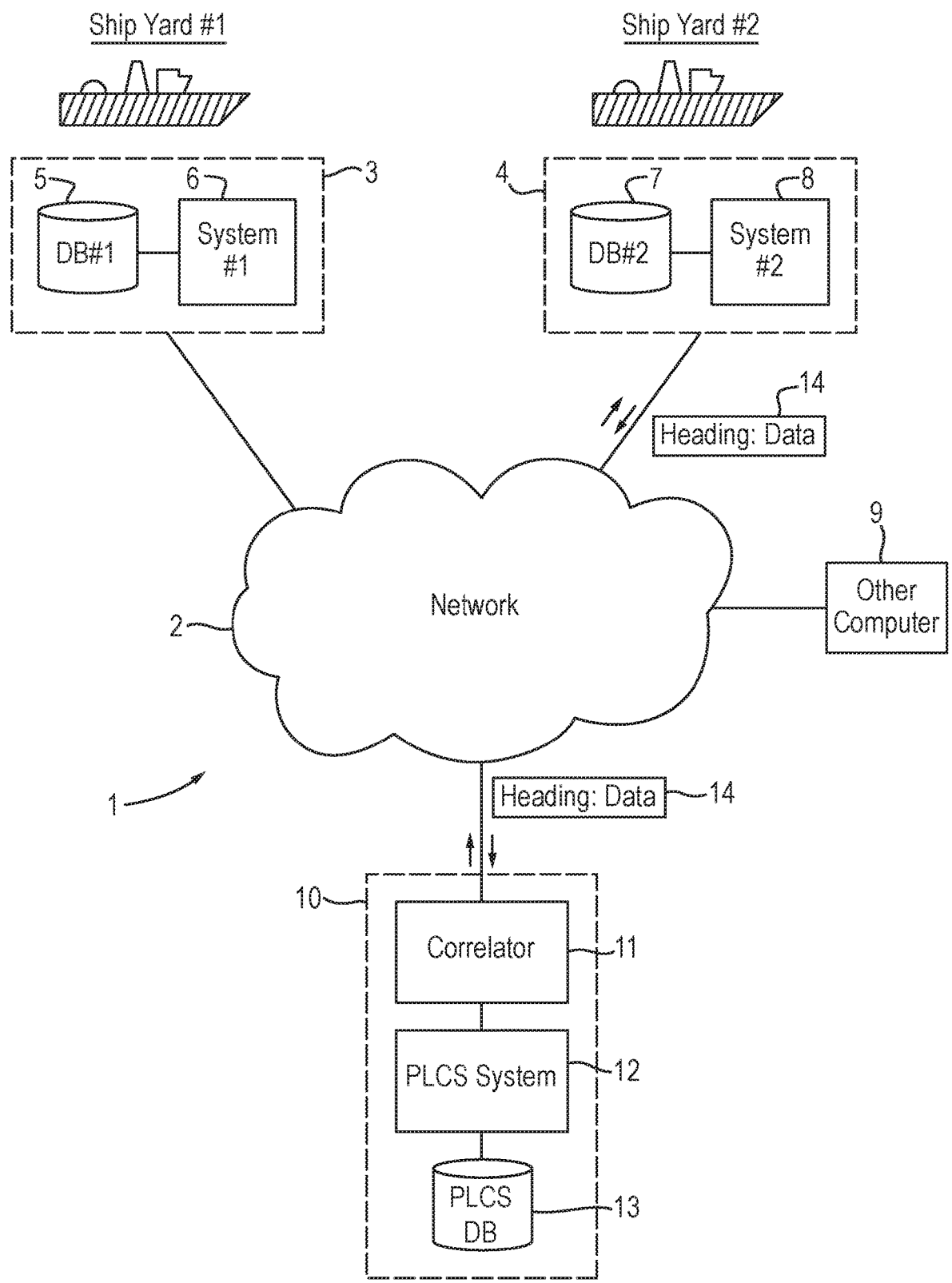
FIG. 1 schematically shows a network system for implementing an embodiment of the invention.

In the drawings, like items are assigned like reference symbols.

FIG. 1 schematically illustrates a networked system (1) of databases and computers according to an embodiment of the invention. The system comprises a communications network (2), such as an intranet or the Internet, to which are linked a first shipyard (3) and a second, separate shipyard (4). Both shipyards contain respective ship maintenance records containing data and information concerning the maintenance history for each vessel that has entered the shipyard in question for maintenance. Maintenance records might include, for example, a service history containing information such dates when a vessel entered the shipyard, the identity of the vessel, the work performed on the vessel by the shipyard staff, reports of shipyard staff concerning outcomes/assessments of the vessel and/or work done on the vessel by them, components within the vessel replaced whilst in the shipyard, or identified as requiring replacement, etc.

Both shipyards also contain respective stock records containing data and information concerning the stock of components and spare parts held by the shipyard at a given time. Components and spare parts might include those suitable for maintaining and servicing ships entering the shipyard for that purpose (e.g. engine parts, ship's equipment, components for power a ship's supply system, ship's communication components etc.).

This information, both maintenance history and stock records, regarding the first shipyard (3), is contained in a first database (5) of the first shipyard, and controlled by a first computer system (6) of the first shipyard. Similarly, maintenance history and stock records regarding the second shipyard (4), is contained in a second database (7) of the second shipyard, and is controlled by a second computer system (8) of the first shipyard.

The first and second databases, of the first and second shipyards, are each arranged and constructed such that the data and information within them contains headings data identifying the user data elements. For example, the first and second shipyards may each employ a heading, amongst many other headings, identified as "NatoStockNo." which indicates that the data entry associated with that heading relates to information concerning a ship's part (e.g. a pre-defined 3$^{rd}$ party stock numbering system; etc.). Similarly, in another example, whereas the first shipyard may employ a heading identified as "Part Title" or "Weight", the second shipyard may employ a heading identified as "Asset Title" or "Mass" for the very same object (an engine or rudder of a ship). A User Object (14) may be regarded as a packet (for transmission) comprising headings and containing a attributes data elements, and the first and second computer systems of the first/second shipyards are arranged to transmit and receive User Objects from central data system (10) via a network (2). Within each User Object, the user data element comprises/identifies data/information associated with that heading (e.g. a stock number; the part title; its weight, etc.)

The central data system comprises a PLCS database (13) managed and controlled by a PLCS computer system (12). The PLCS database comprises data elements/entries according to a PLCS database domain model and naming convention. The central data system is arranged in communication with the communications network to permit communication with the first and/or second shipyards.

Optionally, an external computer device (9) may be arranged in communication with the communications network for communicating with the central data system and the PLCS database within it. This allows third parties (e.g. another shipyard, or an administrator) access to the central data system, such as for transmitting and/or receiving User Objects (14).

The central data system comprises a host computer system (11) referred hereafter as a "correlator unit". The correlator unit is arranged in communication with the communications network and with the PLCS computer system (12) and thereby with the PLCS database. The correlator unit is arranged to implement a receive a User Object (14) from the first/second shipyard computer system (or optionally from the external computer device (9)) via the communications network. The User Object includes heading data and user data elements (e.g. attributes) within the User Object in association with the heading data.

The correlator unit is arranged to correlate the heading data of the User Object with heading data used in the PLCS database thereby identifying a correlated entry in the PLCS database to be associated with the User Object. A method of correlating data headings of a User Object (which uses a shipyard's database domain model schema and record naming convention) with heading data of the PLCS database, is schematically shown in FIG. 3. The correlator unit (11) contains a map (30) comprising a collection of heading data classified as "PLCS database headings" and these data fields list the terminology for data objects (e.g. attribute data) according to the PLCS domain model schema and naming convention. The map (30) also contains a collection of data fields classified as "first database headings" and another collection of data fields classified as "second database headings", and these collections of data fields list the terminology for headings according to the domain model schema and naming convention employed by the first database and by the second database, respectively, of the first and second shipyard. The domain model schema and naming conventions of the first and second databases differ from each other and each also differs from the PLCS domain model schema and naming convention employed by the PLCS database (13).

The map is constructed and arranged to directly associate a given first/second database heading data with an associated or corresponding PLCS database heading data. This enables the correlator unit to, in effect, translate a term/name/heading compliant with the domain model schema and naming convention of any one the first database, second database and PLCS database domain model schema and naming conventions, into any associated/corresponding term/name compliant with the domain model schema and naming convention of any other one the first database, second database and PLCS database domain model schema and naming conventions. The map may store all corresponding terms/names in association with each other in the manner of a look-up-table, or dictionary of terms, and/or may employ pointers stored in the correlator unit in association with term/name which points to each of the one or more corresponding terms/names stored in the correlator unit.

The PLCS system (12) is arranged to receive from the correlator unit the correlated entry obtained from the map (30) and to search the PLCS database using that correlated entry, and retrieve one or more data elements from the PLCS database according to that search. The correlated entry will be expressed in terms compliant with the PLCS domain model schema and naming convention and so this enables the PLCS system to perform searching of the PLCS database directly using the correlated entry obtained from the map (30) by the correlator unit.

The PLCS system is arranged to output to the first/second shipyard (i.e. the 'user') a return User Object which includes the heading data identifying the return User Object according to the naming convention of the shipyard in question and which includes the retrieved data elements(s) e.g. attribute values.

As a result of the process of correlation, the translator unit enables meaningful communication and data access (e.g. searching, input, retrieval) with the PLCS database to take place from either one of the two shipyards despite the fact that the two shipyards employ different naming conventions for common objects/actions/data items. The effect is that the first or second shipyard is able to "speak to" the PLCS system (12) using the "language" (i.e. domain model schema and naming convention) understood by the first/second shipyard, and make full use of the PLCS database in spite of the fact that the PLCS database uses a different "language" (i.e. domain model schema and naming convention). Similarly, PLCS system is able to "speak to" the first/second shipyard using the "language" (i.e. domain model schema and naming convention) understood by that shipyard, in spite of the fact that the shipyards' databases each use a different "language" (i.e. domain model schema and naming convention). The translator unit may, conceptually, be regarded as a "filter" though which any one shipyard is able to "speak" to the PLCS system in its own "terms", and vice versa.

The PLCS computer system (12) is also arranged to receive one or more of the user data element(s), e.g. attribute values, contained within the received User Object (14) and enter one or more of those user data elements as a new data element of the PLCS database at a location therein determined according to the search done using the correlated entry.

Because the heading data corresponds to a heading from a shipyard's database, in providing a return User Object, the correlator unit is arranged to use the map (30) to correlate the one or more retrieved PLCS data elements (using the PLCS heading associated with them) with a data field from the user database thereby identifying a correlated entry from the shipyard's database. This correlated heading is then associated with the one or more retrieved PLCS data elements, and used in the return User Object subsequently output.

The PLCS computer system and PLCS database are each compliant with the PLCS open standard ISO 10303-239.

Figure 2:
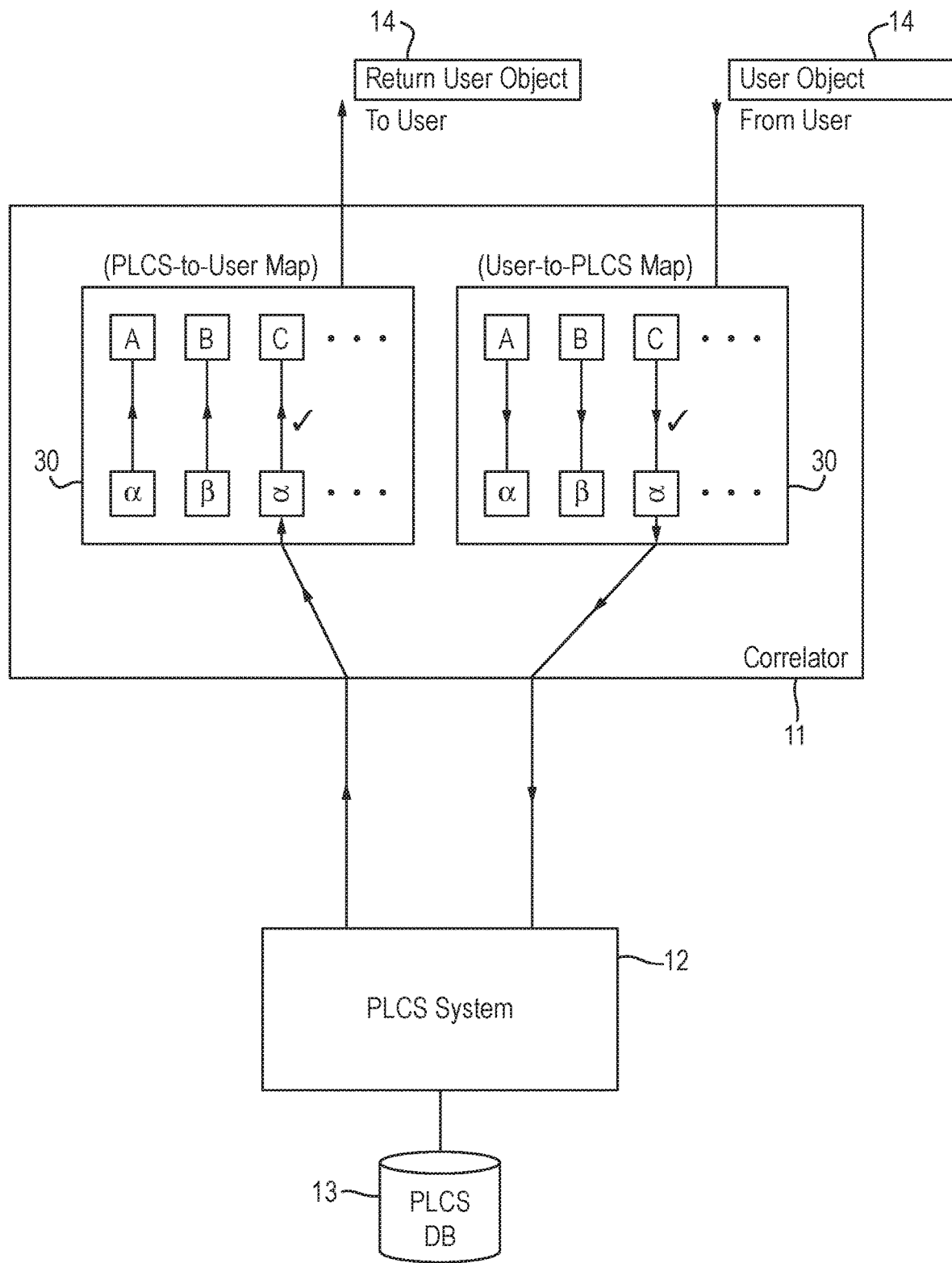
FIG. 2 schematically shows a detailed view of a part of the network system of FIG. 1.

This two-way system for correlating heading data (generically: "A"; "B"; "C"; ...) of the domain model schema and naming convention of a shipyard to the heading data (generically: "α"; "β"; "γ"; ...) of a PLCS database, to permit receipt and transmission of User Objects and return User Objects, is schematically illustrated in FIG. 2. The generically-represented map (30) of FIG. 2 relates to the more specific (non-limiting) example of FIG. 3 as follows:

A="Part Title"→α="Asset Slot Title"
B="Weight"→β="Mass (kg)"
C="Color"→γ="Colour"

Figure 4:
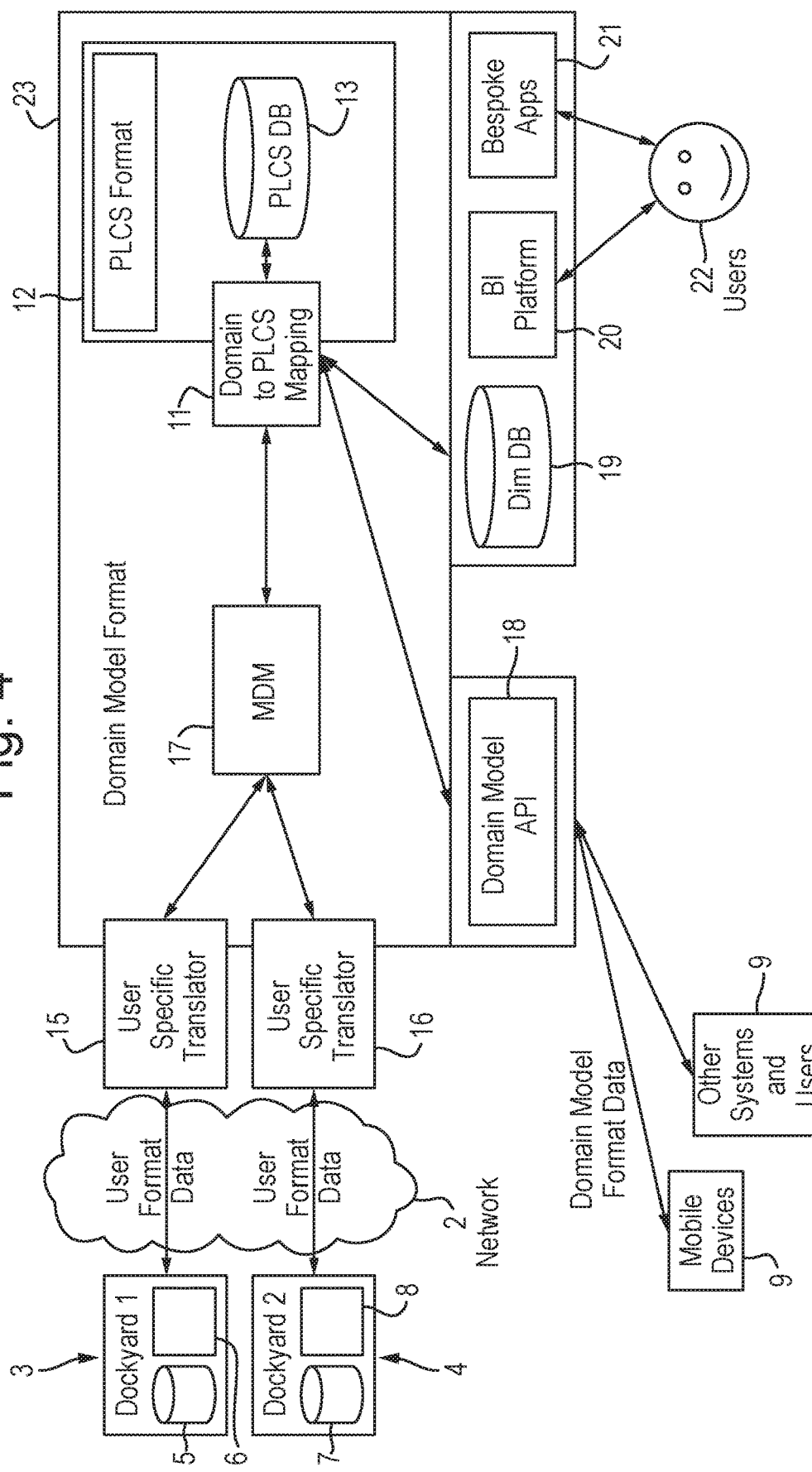
FIG. 4 schematically shows a system for implementing an embodiment of the invention.

FIG. 4 schematically shows an embodiment of the invention. This figure shows a networked computer system similar to the system of FIG. 1. This system is arranged to provide access to a PLCS database, and includes a storage device (13) including a PLCS database of PLCS data elements arranged in communication with a communications network (2). Two client apparatuses (3, 4) are arranged in communication with the communications network for accessing the PLCS database. A host computer system (23) is arranged in communication with the communications network and with the storage device. The host computer system is arranged to receive from any one of the two client apparatus (3, 4) a communication (e.g. data exchange packet), via the network (2), containing input data items for entry in the PLCS database and headers associated with them. The headers are expressed according to the domain model schema of the client apparatus, which is typically not a PLCS format. The host computer is arranged to correlate the headers contained within the received communication, with headers used in the PLCS database (e.g. amongst all headers used in the PLCS database). This occurs using a mapping procedure carried out by a mapping unit (11) of the host computer, such as is described above.

The host computer system includes a plurality (two shown here) of user-specific translators (15, 16) each one of which is arranged in communication with a respective one of the client apparatuses (3, 4) via the network (2). Each user-specific translator is arranged to initially map between headers of the communication from its respective client apparatus, received in a domain model schema associated with that client apparatus, and a replacement header format according to a respective client format mapping. This mapping is defined by a domain model which defined the correlation between the format/naming-convention of the respective client apparatus to the replacement header format/naming convention. This replacement header format is the format employed by the host computer system to correlate with, or map to, the PLCS domain model schema.

Thus, a first user-specific translator (15) is provided for mapping content of the communications from/to a first client apparatus (3) from/to a format associated with the first client apparatus to/from the replacement header format according to a first client format mapping (e.g. a first domain model). A second user-specific translator (16) is provided for mapping content of the communications from/to a second client apparatus (4) from/to a format associated with the second client apparatus to/from the replacement header format according to a second client format mapping (e.g. a second domain model).

The host computer system also includes a mapping unit (11) arranged for mapping/translating the replacement headers from the client apparatuses, to headers used in the PLCS database. The mapping is performed from the replacement header format (e.g. a domain model) to the PLCS domain model schema and format when inputting new data to the PLCS database, and in reverse order when outputting data from it.

Thereby, the host computer is able to identify a correlated data field of the PLCS database to be associated with the input data item (e.g. attribute value). In other words, the PLCS mapping unit (11) is able to translate from the format of the received communication, into the format of the PLCS database system.

Once mapped, the host computer system is arranged to search the PLCS database (13) to access an entry therein associated with the correlated data field within the communication received from the user apparatus (3), and to update the entry of the PLCS database according to the input data item. In this way, the host computer system is able to permit a non-PLCS formatted data entry to be submitted to the PLCS database by the client apparatus (3), and to update the PLCS database appropriately with the information in a PLCD format.

Furthermore, the host computer system is also arranged to operate a reverse process whereby another, second, client apparatus (4) may be notified of the new entry made in the PLCS database by first client apparatus (3). To do so, the host computer system retrieves the updated PLCS data entry from the PLCS database, and re-correlates the correlated data field of the PLCS database with a second identifier associated with a second client apparatus (4). This re-correlation is done by the PLCS mapping unit (11) which maps the retrieved PLCS data entry into the intermediate domain model format, and then translates the result into the user-specific format using the translator unit (16) associated with the second client apparatus. The host computer system outputs to the result to the second client apparatus via the network (2). The communication so output contains an output data item according to the updated PLCS database entry which includes a second identifier identifying the output data item to the second client apparatus (i.e. in a format it can read/understand).

Thus, in this way the first header in the communication from the first client apparatus (3) may correspond to headers from a first client database (5), and the second header in the communication from the second client apparatus (7) may correspond to headers from a second client database. The re-correlating identifies a correlated entry from the second client database to be associated with the updated PLCS data field.

Indeed, the PLCS database may be accessed by other client apparatuses (9) which may be arranged to be compatible with the common replacement domain model format employed by the host computer system, thereby obviating the need for user-specific translators for communications to/from such other client apparatuses. This communication may be via a domain model Application Program Interface (API, 18). For example, 'dimensional model' databases (19)—e.g. arranged to generate time-dependent trends/forecasts in data—may access the PLCS database via the correlator unit using the intermediate domain model format, in order to provide business intelligence (BI) analysis and modelling (20) and applications (21). These may be very useful in predicting future requirements/needs of the asset in question, by enabling forward prediction. This is made feasible by having access to a PLCS database with up-to-date and reliable data provided by multiple users/client-apparatuses.

In practice, different client apparatuses employ different headers to identify the same item/asset represented in the PLCS database. These different headers may change over time as different user apparatuses wishing to access the PLCS database may tend not to coordinate their headers amongst each other, and each apparatus is controlled by an independent organisation employing its own domain model schema on identifying relevant assets represented in the PLS database. These domain model schema often change and evolve over time. To address this, the host computer system may be arranged to assign a respective priority value to each of the first and second identifiers and to employ in the PLCS database the identifier having the highest priority value as the common identifier. In this way, the host computer system may be kept up-to-date with naming trends and reduce the risks of using obsolete headers.

The host computer system may implement algorithms for calculating a respective priority value for each of the first and second headers according to, for example, a combination of a plurality of priority weighting values determined according to predetermined characteristics of each of the first and second headers. For example, a priority value may be calculates according to an assessment of one or more characteristics, selected from a predetermined number of characteristics. An example of suitable characteristics is as follows:

(1) Is the client apparatus associated with the second header more trustworthy (e.g. less error prone, historically; e.g. known to the system for longer) than the client apparatus associated with the first header? If so then use the second header.

(2) Is there no entry in the header associated with the first client apparatus? If so, then use the second header.

(3) Is the first header incomplete/corrupted? If so, then use the second header.

(4) Has the first header not been employed/used/seen in a data exchange packet for more than a preceding specified period of time (e.g. a year). If so then use the second header (e.g. the first header likely out of date).

The algorithm may implement any one or more of interrogations (1) to (4) and if all individually result in a conclusion to use the second header, then on that condition the outcome may be to use the second header.

In this way data may be 'cleansed' by algorithmically selecting the optimal (highest priority) header from amongst any two headers so compared. This means that poor, out or date, or otherwise sub-optimal headers may be gleaned through the on-going use of the system so that the system auto-learns/auto-updates and optimises the interface with the PLCS database making it more robust and reliable to use by multiple users/client apparatus.

Figure 5:
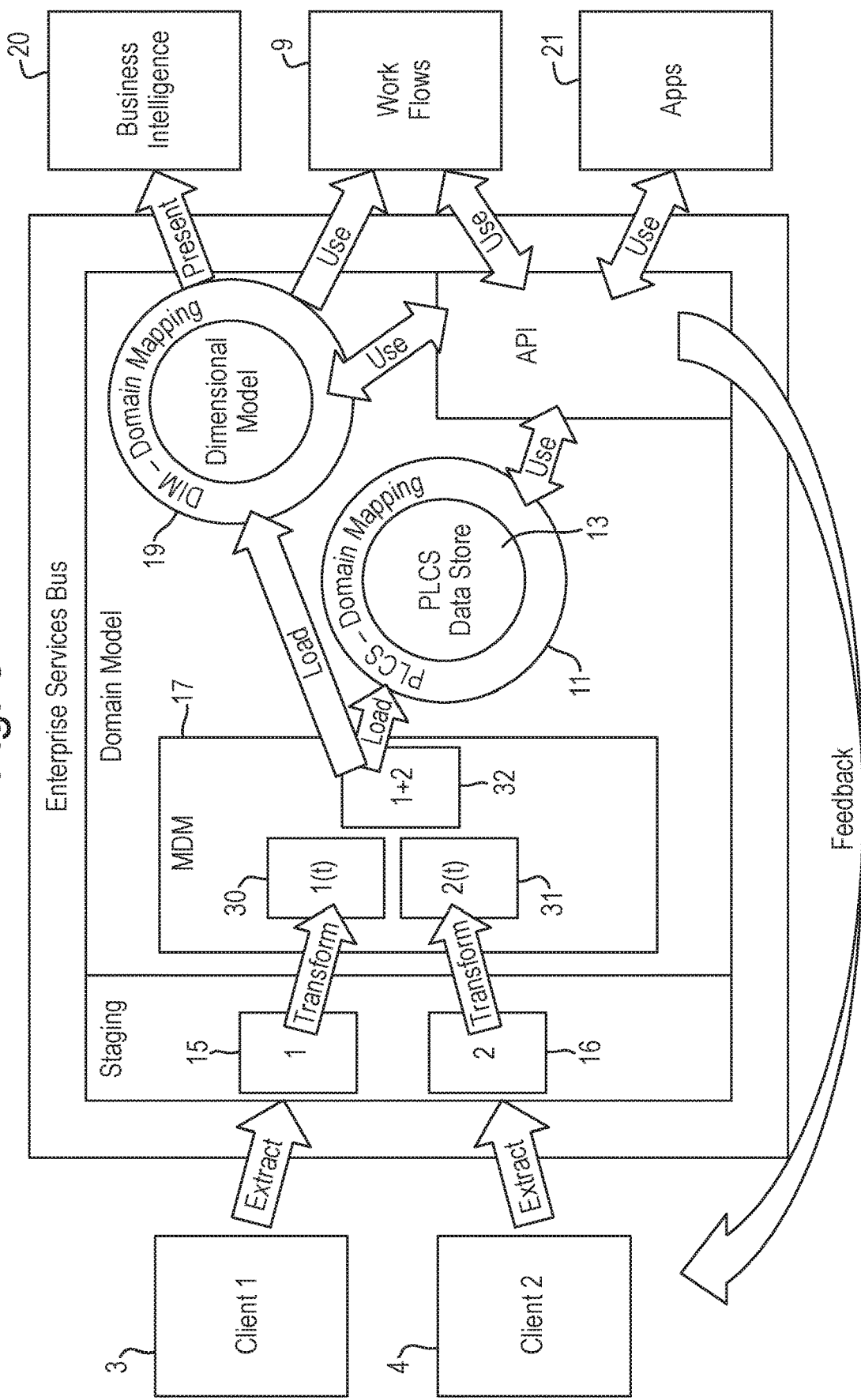
FIG. 5 schematically shows a more detailed view of FIG. 4.
Figure 6:
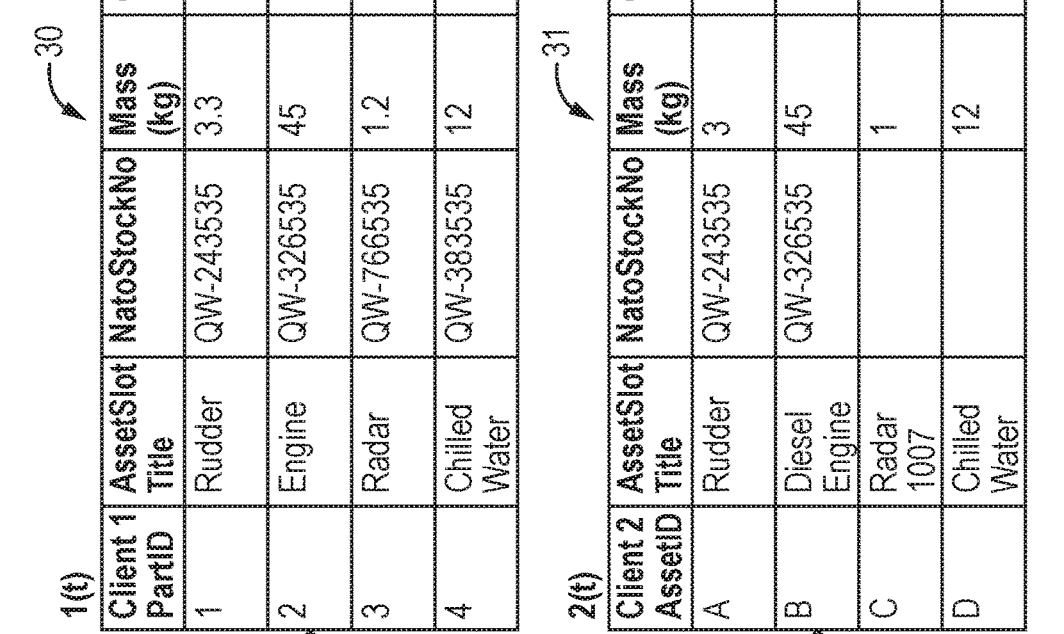
FIG. 6 schematically shows the local transformation process applied to data exchange packets input to the database system from two separate client apparatuses, to provide transformed data exchange packets sharing replacement headers in common.

This process is schematically illustrated in FIG. 5 which shows a more detailed view of FIG. 4, and is supported by FIG. 6 and FIG. 7 as follows. The input data exchange packets (15, 16) from the two separate client apparatuses (3, 4) are transformed to provide transformed data exchange packets (30, 31) sharing replacement headers in common. Data cleansing is then applied to these two transformed data exchange packets by selecting optimal attributes from the two transformed data exchange packets for use in one master data exchange packet 32 for mapping to the PLCS database 13.

In particular, the computer or computer network system receives two data exchange packets (15, 16) each comprising data fields (34, 35) and populated with data according to different respective database schema. Each data exchange packets comprises identity data (ID) (see item 15, 16: first, leftmost column of the logical table) within respective data fields identifying a respective entity. For example, ID values of: 1, 2, 3, 4 are used in data exchange packet 15 to identify separate entities. For example, ID values of: A, B, C, D are used in data exchange packet 16 to identify separate entities. Attribute data (see item 15, 16: second to fifth columns of the logical table) resides within respective data fields identifying an attribute of each entity, respectively.

Each received data exchange item comprises field headers (33, 38) associated with respective the data fields according to the respective database schema. The system is arranged to transform one or more field headers 33 of the received data exchange packets (15, 16) into a common, replacement field header format according to a common domain model schema. In the transformation process, data values remain the same, but the data's schema is transformed to the new Domain Model's schema.

Figure 7:
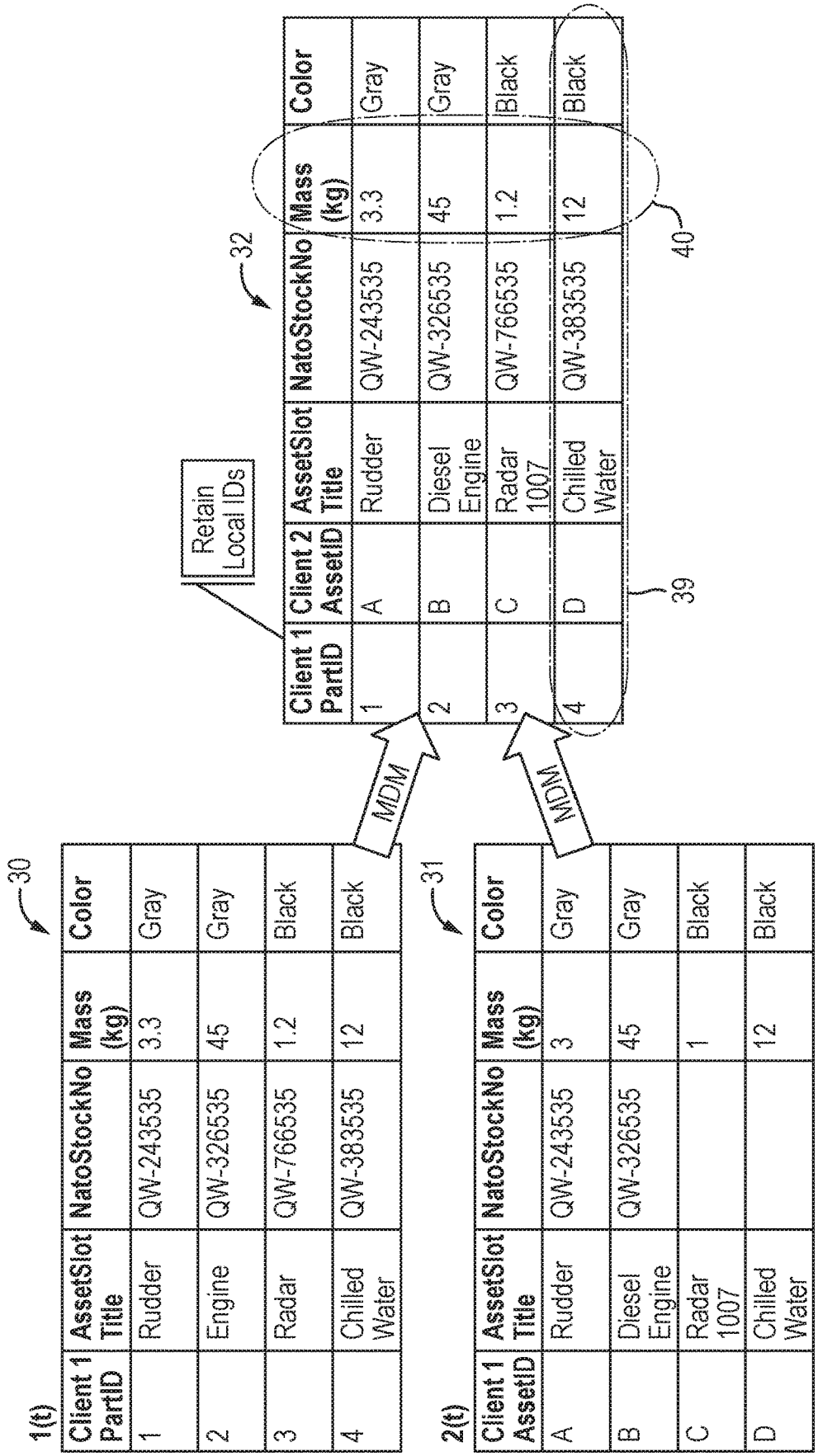
FIG. 7 schematically shows the process of data cleansing by selecting optimal attributes from the two transformed data exchange packets for use in one master data exchange packet for mapping to the PLCS database.

Referring to FIG. 7, the system selects, for each entity, from amongst the attribute data of the two transformed data exchange packets (30, 31), the optimal attribute data thereof, and generates a master data exchange packet 32 comprising the common field replacement headers as field headers of the master data exchange packet, and including the selected optimal attribute data in data fields of the master data exchange packet in association with its field headers. This data-cleansed data exchange packet is then ready to be used in conjunction with the PLCS database. In particular, the system is arranged to generate the master data exchange packet comprising the identity data ('Local ID': e.g. 'PartID' and 'AssetID') from the received data exchange packets in association with corresponding entities of the master data exchange packet.

The system is arranged to map the field headers of the master data exchange packet to corresponding field headers of the PLCS database schema, and to load the optimal attribute data of the master data exchange packet into the PLCS database according to the mapped PLCS field headers. This process is illustrated in FIG. 7 as a 'Master Data Management' process in which similar records are matched via global identifiers (e.g. NatoStockNo), or via data values. Algorithms are used to extract the preferred data from the systems (e.g. Client 1 (packet 30) has more accurate Mass data, but Client 2 (packet 31) uses British English).

As a result, the system may receive the two or more data exchange packets (15, 16) which each contain identity data ('Local ID') within respective data fields identifying a respective entity, and attribute data within respective data fields identifying an attribute of each entity, respectively. It may select, for each entity, from amongst the attribute data, the optimal attribute data, and configure the computer memory of the system according to a logical table represented by the master data exchange packet 32. This includes:
- a plurality of logical rows 39 each corresponding to a record of information comprising the optimal attribute data. Each logical row has two or more of the 'Local ID' identity data (PartID=4; AssetID=D) from the received data exchange packets which each separately identify the same logical row;
- a plurality of logical columns 40 intersecting the plurality of logical rows to define a plurality of logical cells, each logical column having a respective field header (e.g. 'Mass (kg)') to identify the logical column and in which at least one logical column comprises optimal attribute data.

The computer or computer network system is arranged to map the field headers of the logical table to corresponding field headers of the PLCS database schema. By retaining the 'Local ID' attribute values and associated headers, the system is able to immediately identify the originating source from which the optimal data was selected. Retaining Local IDs is particularly useful for the following reasons. The Local ID may be used by the computer system of the invention as the means of identifying an object for the Client (both in the local database of the Client apparatus and in the PLCS database). The Client apparatus may subsequently refer to that same entity by/using their Local ID. Note that the local Client apparatus is unlikely to start using any PLCS derived ID as a Client apparatus need not (and very likely does not wish to) concern itself with the PLCS system. One may consider any/all local Client systems to be entirely parochial. This means that the computer system of the invention may be such that it does not need to identify an item by tenuous, parochial identifiers such as names, which is likely to change over time and is not a guaranteed identifier.

By retaining the Local ID, the computer system of the invention may provide that if a Client apparatus subsequently provides the computer system with an update to the entity (e.g. if the attribute is a weight value, then it changes that weight value), the invention allows one to retrieve the entity from the PLCS database via the Local ID for the Client because the system has that data, and then to run the PLCS-held data alongside the newly arrived/updated data against the same MDM algorithms (see 17, FIG. 5) used previously. If the new data from the Client acquires a suitably high priority, then the computer system may update the PLCS database with the new data. Thus, by holding the Local ID enables the computer system with implementing the following:

1. Further updates from the Client apparatus—as described above;
2. Requests for data—e.g. if the Client apparatus wants to know what the 'assured' data for a given entity is, it can provide its Local ID and the computer system may identify that in terms suitable for the PLCS database, so that the latter will 'know' which entity is being talking about. The computer system nay then provide that sought—after information back to the enquiring Client apparatus via an application program interface (API) providing an interface to the PLCS system for client applications (see FIG. 5, "Feedback");
3. Tracking sources—the PLCS database may be used to track from which system it received changes, by linking the change to the Client's Local ID.

The embodiments described herein are presented so as to allow a better understanding of the invention, and are not intended to limit the scope of the inventive concept of the invention. Variations, modifications and equivalents to the embodiments described herein, such as would be readily apparent to the skilled reader, are intended to be encompassed within the scope of the invention.

The invention claimed is:
1. A method for providing access to a database for product life cycle support (PLCS) database), the method comprising:
   receiving from a first client apparatus an input data item including heading data associated with a first database schema and identifying the input data item;
   correlating said heading data with a data field used in the PLCS database, the PLCS database having a second database schema different from the first database schema, thereby identifying a correlated entry in the PLCS database to be associated with the input data item;
   searching the PLCS database using said correlated entry;
   entering a received data element from the input data item as a new data element of the PLCS database at a location therein determined according to said search;

retrieving one or more data elements from the PLCS database according to said search;

correlating said one or more retrieved data elements from the PLCS database having the second database schema with a return data item having heading data associated with a third database schema different from the first and second database schemas; and outputting to a second client apparatus the return data item which includes said heading data associated with the third database schema.

2. The method according to claim 1, wherein the received input data item includes a plurality of data elements.

3. The method according to claim 1, including providing a mapping database containing a plurality of heading data items from a client database having the first database schema and a plurality of data fields used in the PLCS database, wherein each said heading data item is stored in the mapping database in association with a respective said data field, and said correlating said heading data includes searching said mapping database to identify a said association.

4. The method according to claim 1, including providing a mapping database containing a plurality of heading data items from a client database having the third database schema and a plurality of data fields used in the PLCS database, wherein each said data field is stored in the mapping database in association with a respective said heading data item, and said correlating said one or more retrieved data elements includes searching said mapping database to identify a said association.

5. The method according to claim 1, including:

receiving from the first client apparatus a first communication containing a first identifier identifying data for entry in the PLCS database;

receiving from the second client apparatus a second communication containing a second identifier different from the first identifier and identifying data for entry in, or retrieval from, the PLCS database;

comparing the second identifier to the first identifier; and in response to the comparison identifying a commonality between the second identifier and the first identifier,
determining that both the second identifier and the first identifier correspond to a common data entry in the PLCS database,
mapping the second identifier and the first identifier to a common identifier for the PLCS database, and
accessing the PLCS database using the common identifier according to the second communication.

6. The method according to claim 5, in which the second communication further contains second data for entry in the PLCS database, and said accessing includes entering the second data into the PLCS database at a location therein according to the common identifier.

7. The method according to claim 5, in which the first communication contains first data and the second communication further contains a request for retrieval of the first data in the PLCS database, and said accessing includes retrieving the first data in the PLCS database from a location therein identified according to the common identifier.

8. The method according to claim 5, including:

mapping content of the first communication from a format associated with the first client apparatus to an intermediate format according to a first client format mapping; and mapping content of the second communication from a format associated with the second client apparatus to said intermediate format according to a second client format mapping;

wherein the mapping of the second identifier and the first identifier to a common identifier for the PLCS database is performed in respect of said intermediate format.

9. The method according to claim 5, including assigning a respective priority value to each of the first and second identifiers and employing in the PLCS database the identifier having the highest priority value as the common identifier.

10. The method according to claim 9, in which a highest priority value amongst the priority values assigned to the first and second identifiers is assigned to the identifier most recently received.

11. The method according to claim 9, including calculating a respective said priority value for each of the first and second identifiers according to a combination of a plurality of priority weighting values determined according to predetermined characteristics of each of the first and second identifiers.

12. The method according to claim 9, wherein assigning a respective priority value to each of the first and second identifiers comprises determining if the second client apparatus associated with the second identifier is more trustworthy than the first client apparatus associated with the first identifier.

13. A system for providing access to a database for product life cycle support (PLCS) database), the system comprising:

a storage device including a PLCS database having PLCS data elements and arranged for communication with a communications network; and a host computer system arranged for communication with the communications network and with the storage device, wherein the host computer system is arranged to receive an input data item from a first client device via the communications network, the input data item including heading data associated with a first database schema and identifying the input data item, correlate said heading data with a data field used in the PLCS database, the PLCS database having a second database schema different from the first database schema, thereby identifying a correlated entry in the PLCS database to be associated with the input data item, search the PLCS database using said correlated entry, enter a received data element from the input data item as a new data element of the PLCS database at a location therein determined according to said search, retrieve one or more data elements from the PLCS database according to said search, correlate said one or more retrieved data elements from the PLCS database having the second database schema with a return data item having heading data associated with a third database schema different from the first and second database schemas, and output to a second client device the return data item which includes said heading data associated with the third database schema.

14. The system according to claim 13, wherein the host computer system is arranged to:

receive a plurality of client data elements within the received input data item.

15. The system according to claim 13, wherein the host computer system comprises a mapping database containing a plurality of heading data items from a client database having the first database schema and a plurality of data fields used in the PLCS database, wherein each said heading data item is stored in the mapping database in association with a respective said data field, and wherein the host computer system is arranged to search said mapping database to identify the correlated entry in the PLCS database to be associated with the input data item.

16. The system according to claim 13, further comprising the first client device and the second client device.

17. A computer program product including one or more non-transitory machine-readable mediums encoded with instructions that when executed by one or more processors cause a process to be carried out for communicating with a database for providing access to a database for product life cycle support (PLCS) database database), the process comprising:
  receiving an input data item from a first client device via the communications network, the input data item including heading data associated with a first database schema and identifying the input data item;
  correlating said heading data with a data field used in the PLCS database having a second database schema different from the first database schema, thereby identifying a correlated entry in the PLCS database to be associated with the input data item;
  searching the PLCS database using said correlated entry;
  entering a received data element from the input data item as a new data element of the PLCS database at a location therein determined according to said search;
  retrieving one or more data elements from the PLCS database according to said search;
  correlating said one or more retrieved data elements from the PLCS database having the second database schema with a return data item having heading data associated with a third database schema different from the first and second database schemas; and
  outputting to a second client device the return data item which includes said heading data associated with the third database schema.

18. The computer program product according to claim 17, wherein the process includes:
  receiving a plurality of client data elements within the received input data item.

19. The computer program product according to claim 17, wherein the process includes one or more of:
  providing a first mapping database containing a plurality of heading data items from a client database having said first database schema and a plurality of data fields used in the PLCS database, wherein each said heading data item is stored in the first mapping database in association with a respective said data field, and said correlating said heading data includes searching said first mapping database to identify a said association; and/or
  providing a second mapping database containing a plurality of heading data items from a client database having the third database schema and a plurality of data fields used in the PLCS database, wherein each said data field is stored in the second mapping database in association with a respective said heading data item, and said correlating said one or more retrieved data elements includes searching said second mapping database to identify a said association.

20. The computer program product according to claim 17, wherein the process includes:
  receiving from the first client apparatus a first communication containing a first identifier identifying data for entry in the PLCS database;
  receiving from the second client apparatus a second communication containing a second identifier different from the first identifier and identifying data for entry in, or retrieval from, the PLCS database;
  comparing the second identifier to the first identifier; and
  in response to the comparison identifying a commonality between the second identifier and the first identifier,
    determining that both the second identifier and the first identifier correspond to a common data entry in the PLCS database,
    mapping the second identifier and the first identifier to a common identifier for the PLCS database, and
    accessing the PLCS database using the common identifier according to the second communication.

* * * * *